United States Patent [19]

Harbison et al.

[11] Patent Number: 4,687,023
[45] Date of Patent: Aug. 18, 1987

[54] BALL CHECK VALVE

[75] Inventors: Joe A. Harbison, Gladstone, Mo.; Darryl M. Nielsen, Lenexa; Dorothy D. McDaniel, Leawood, both of Kans.

[73] Assignee: The Marley-Wylain Company, Mission Woods, Kans.

[21] Appl. No.: 849,961

[22] Filed: Apr. 10, 1986

[51] Int. Cl.⁴ .................................. F16K 15/04
[52] U.S. Cl. ....................... 137/533.13; 137/533.11
[58] Field of Search .............. 137/533.11, 533.13, 137/533.15, 539

[56] References Cited

U.S. PATENT DOCUMENTS

| | | | |
|---|---|---|---|
| 628,779 | 7/1899 | Essex | 137/533.15 |
| 841,474 | 1/1907 | Wendelken | 137/533.11 X |
| 975,243 | 11/1910 | Hitchcock | 137/533.11 |
| 1,700,234 | 1/1929 | McCrosky | 137/533.11 |
| 2,103,427 | 12/1937 | Long | 137/533.11 |
| 2,192,541 | 3/1940 | Davis | 137/533.13 X |
| 3,105,516 | 10/1963 | Werra at al. | 137/533.11 |
| 3,346,008 | 10/1967 | Scaramucci | 137/533.15 X |
| 3,741,243 | 6/1973 | Diebler et al. | 137/528 |

FOREIGN PATENT DOCUMENTS

| | | | |
|---|---|---|---|
| 617152 | 8/1935 | Fed. Rep. of Germany | 137/533.11 |
| 1057840 | 5/1959 | Fed. Rep. of Germany | 137/533.11 |
| 7514118 | 6/1977 | Netherlands | 137/533.11 |

Primary Examiner—Alan Cohan
Assistant Examiner—John A. Rivell
Attorney, Agent, or Firm—Schmidt, Johnson, Hovey & Williams

[57] ABSTRACT

A check valve assembly includes a generally bell shaped casing having a flared, open end section and a fluid inlet in opposed relation to the flared end section. A body removably connected to the casing covers a portion of the flared end section and has a fluid outlet as well as two spaced, outwardly extending ball guiding members which are matingly received within opposed walls of the casing. The ball guiding members are configured to shift the ball along a path of travel between a first, flow impeding position adjacent the fluid inlet and a second position spaced from the inlet and disposed laterally of a substantially straight fluid passageway extending between the inlet and the outlet. In preferred forms of the invention, the path of travel of the ball has a variable slope which approaches zero as the ball reaches its uppermost, flow enabling position so that a minimum amount of fluid pressure on the ball can retain the latter in its uppermost position, ball flutter and fluid turbulence is substantially reduced. In other forms of the invention, the body includes a stop which contacts the ball in a relatively small surface area of the latter when the ball is in its flow enabling position so that a portion of the fluid flowing through the valve assembly travels around the ball and cleanses the same, and so that stagnant pockets of fluid are eliminated.

9 Claims, 4 Drawing Figures

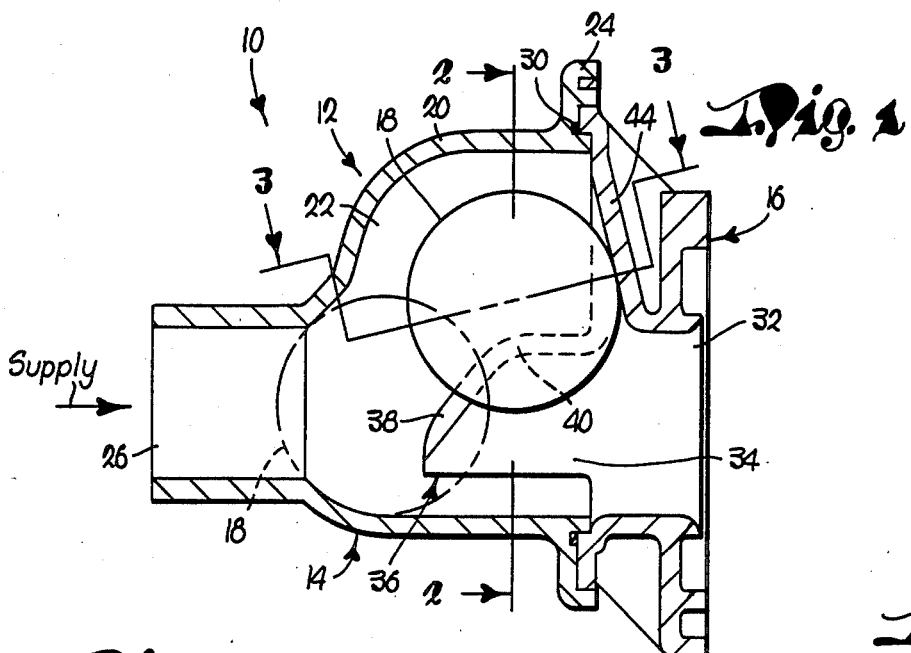
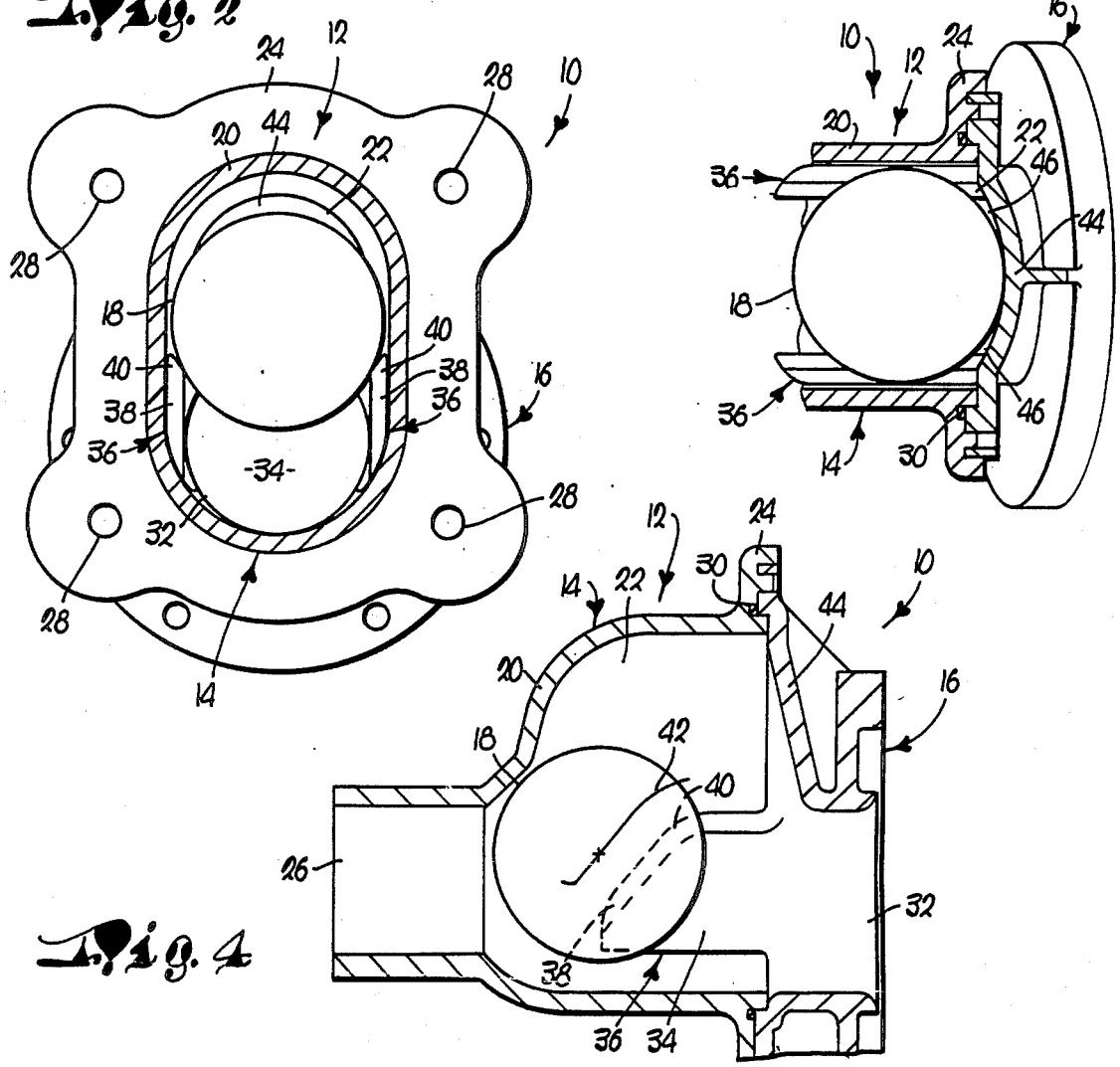

BALL CHECK VALVE

BACKGROUND OF THE INVENTION

1. Field of the Invention

This invention relates to a check valve assembly wherein a ball is movable along a curved path of travel between a first, flow impeding position adjacent a fluid inlet and a second, flow enabling position spaced from the inlet, and wherein the second position is disposed laterally of a substantially straight fluid passageway between the fluid inlet and a fluid outlet. A housing for the assembly includes two opposed, spaced members for guiding the ball between the first position and the second position, and the configuration of the members as well as the housing walls is such that the ball is continuously cleansed of solid matter by fluid flow around the ball when the latter is in its second, flow enabling position.

2. Description of the Prior Art

A variety of check valves have been proposed in the past for permitting the flow of fluids through a conduit in a first direction, while substantially precluding flow of fluids through the same conduit in an opposite direction. Some check valves are of a "flapper" type and have a hinged valve plug or panel which is shiftable toward a fluid inlet for obstructing flow in one direction, and which is swingable to an open position spaced from the inlet for permitting flow in the opposite direction. It has been found, however, that flapper valves are not entirely satisfactory for certain applications, including instances where the flowing fluid carries solid matter or debris which can become entangled with the valve hinge or otherwise impede smooth, free action of the hinge such that the valve does not open and close within desired specifications.

Other types of check valve assemblies utilize a ball which is shiftable within a chamber of a housing between a flow impeding position adjacent a fluid inlet and a flow enabling position spaced from the fluid inlet. The ball has a diametric cross section larger than the diameter of the fluid inlet, and the housing is provided with a spherical seat for the ball adjacent the fluid inlet so that the ball and seat form a fluid resistant seal to substantially prevent fluid flow in an opposite direction from the chamber and back through the inlet.

Certain types of ball check valves have housings with an internal fluid chamber of a generally "Y" configuration. In these valves, the fluid inlet is located adjacent the juncture of two diverging passageways, and one of the passageways functions as a guiding channel for movement of the ball while the other passageway has a fluid outlet at its outermost end and serves as a fluid conduit between the inlet and outlet. Unfortunately, fluid captured in the channel for the ball is stagnant, which facilitates the collection of solid debris and other foreign matter occasionally to such a degree that the valve is rendered inoperable.

Another type of ball check valve assembly is shown in U.S. Pat. No. 3,741,243 to Deibler et al., which is assigned to the assignee of the present invention. The check valve assembly of this patent has a ball contained within a housing chamber and movable in approximately a straight line between a position adjacent the fluid inlet and a position intermediate the inlet and an outlet port. The chamber includes a bypass region of sufficient cross sectional area to permit fluid flow around the ball when the valve is in its open position.

While the check valve shown in U.S. Pat. No. 3,741,243 represents a significant advance in the art due to elimination of stagnant pockets of fluid, this type of valve can satisfactorily handle fluids carrying solid matter of limited size, since the fluid flow is confined to a somewhat restricted pathway past ball guiding structure and around the surface of the ball until the fluid outlet is reached.

As can be appreciated, it would be a desirable advance in the art if a ball check valve assembly was provided wherein stagnant pockets of fluid are eliminated and the ball is guided away from a straight fluid passageway between a fluid inlet and an outlet so that the ball does not obstruct or otherwise hinder flow of fluids through the valve assembly. Moreover, the check valve housing and ball guiding structure should be configured to eliminate flutter of the ball when the latter is shifted toward a flow enabling position, since such flutter could otherwise cause turbulence in the flow and lead to cavitation.

SUMMARY OF THE INVENTION

The present invention overcomes the above noted disadvantages of prior ball check valve assemblies by provision of a valve housing with ball guiding structure that is operable to shift a ball to a position laterally of a substantially straight fluid passageway between a fluid inlet and outlet, so that the fluid encounters little resistance to flow and relatively large solid matter carried by the fluid can easily pass through the valve housing without encountering obstructions. Stagnant areas of fluid within the housing are eliminated and a small portion of the fluid is diverted around the ball for cleansing the latter. The ball is maintained in its flow enabling position with a minimum of force, so that ball flutter is substantially eliminated.

In more detail, the ball guiding structure of the present invention comprises two opposed, spaced members which engage opposite side regions of the ball and which are configured to guide the ball along a pathway having a variable slope. The pathway of the ball approaches a horizontal axis as the flow enabling position of the ball is reached, so that a minimum amount of force is required to retain the ball in its flow enabling position and, as a result, ball flutter is substantially reduced or eliminated. However, the ball guiding members are configured so that the motion of the ball is not truly horizontal as the latter reaches its flow enabling position, so that the ball can quickly return by gravity to its flow obstructing position adjacent the inlet whenever the flow rate of fluid through the valve approaches zero or begins to travel in a reverse direction through the valve.

The valve housing includes a generally bell shaped casing having a flared, opened end section and a fluid inlet opposite the opened end section. The valve housing also includes a body which is removably connected to the casing flared end section for covering the latter, and the body includes a fluid outlet as well as two outwardly projecting ball guiding members which matingly fit within opposed walls of the flared, opened end section of the casing. As such, the valve housing can be easily opened for inspection and maintenance if necessary, and the ball may be readily removed for replacement.

The body of the valve housing has a stop which engages the ball when the latter is in its flow enabling position. The stop is constructed to contact only a relatively small segment of the ball, so that a portion of the fluid flowing through the valve can flow around the ball and flush solid matter from the surface of the ball. The configuration of the valve casing and cover body is such that stagnant pockets of fluid in the valve are eliminated whenever fluid is flowing through the same, so that debris and other solid matter does not accumulate within the valve during normal use of the latter.

BRIEF DESCRIPTION OF THE DRAWING

FIG. 1 is a side cross sectional view of the check valve assembly of the present invention, wherein the assembly includes a housing having a casing and a cover body in mating contact with the casing, and wherein a ball of the valve assembly is shown in full line to represent its flow enabling position and in broken line to depict its flow obstructing position;

FIG. 2 is an end sectional view taken along line 2—2 of FIG. 1;

FIG. 3 is a cross sectional view taken along line 3—3 of FIG. 1; and

FIG. 4 is a view similar to FIG. 1 wherein the ball is intermediate its flow enabling position and flow obstructing position, and the arcuate pathway of travel of the ball is represented by a line passing through the center of the ball.

DETAILED DESCRIPTION OF THE DRAWING

A check valve assembly is shown in FIGS. 1–4 and is designated broadly by the numeral 10. In general, the assembly 10 comprises a housing 12 which includes a casing 14 and a cover body 16. The assembly 10 also includes a spherical ball 18 which optionally can be comprised of a synthetic rubber material such as neoprene and preferably has a specific gravity at least ten percent greater than the fluid encountered by the assembly 10.

More specifically, the casing 14 is generally bell shaped and has walls 20 defining a chamber 22 which is generally of an oval configuration in vertical section, as best illustrated in FIG. 2. The casing 14 presents a flared, open end section 24 and an outwardly extending, cylindrical fluid inlet 26 (FIGS. 1 and 4) in generally opposed relationship to the flared, open end section 24.

The body 16 is removably connected by fasteners (not shown) to the casing 14 in order to generally cover the open end section 24 when the assembly 10 is in use. The fasteners pass through holes 28 (FIG. 2) provided in the end section 24 to engage surfaces of the body 16, and an O-ring 30 seated within a groove of the end section 24 provides a seal between the casing 14 and the body 16 to resist the leakage of fluid therebetween. The body 16 also has an outwardly projecting, substantially cylindrical fluid outlet 32, so that a generally straight fluid passageway 34 is provided in the chamber 22 between the inlet 26 and the outlet 32.

The body 16 has ball guiding structures or members 36, 36 for guiding the ball 18 along a path of travel between a first, flow impeding position adjacent the inlet 26 and a second position spaced from the inlet 26. The members 36, 36 are each disposed in spaced, opposed relationship on opposite upright portions of the housing walls 20, and are engageable with opposed side regions of the ball 18, as best seen in FIGS. 2 and 3. As shown, the members 36, 36 each have top surfaces 38 which are inclined outwardly in opposite directions. The surfaces 38, 38 are each curved at an area designated as 40, the latter of which lies at an upper portion of the members 36, 36.

The path of travel of the center of the ball 18 as the latter shifts between its first, flow obstructing position adjacent the inlet 26 and its second, flow enabling position spaced from the inlet 26 is shown in FIG. 4 by a line designated 42. The members 36, 36 are spaced a sufficient distance from the fluid inlet 26 such that the ball when moving away from the inlet 26 travels along a short horizontal path before engaging the members 36, 36 and beginning an upwardly inclined movement. Thereafter, kinetic pressure of the fluid flowing through the chamber 22 between the inlet 26 and toward the outlet 32 exerts a force on the ball 18 to propel the same upwardly along an inclined path of travel in engagement with the surfaces 38, 38. Next, as the ball 18 approaches its second, upwardmost position, the curved areas 40, 40 on the members 36, 36 respectively shift the inclination of the path of travel of the ball 18 in such a fashion that the slope of the path of travel approaches zero. Referring to FIG. 4, the line 42 representing the path of travel of the ball 18 includes an upwardmost curved portion which reflects movement of the ball 18 as the latter engages the curved areas 40, 40. However, the path of travel of the ball 18 as the latter approaches its second, upwardmost position should preferably not have a slope which equals zero so that the ball 18 quickly returns by gravity to its flow blocking position adjacent the fluid inlet 26 whenever flow of fluids through the chamber 22 is interrupted or is oriented in a reverse fashion, from the normal outlet 32 of the assembly 10 and toward the normal fluid inlet 26.

The variable slope of the line 42 representing the path of travel of the ball 18 enables the pressure of fluid flowing through the chamber 22 to retain the ball 18 in its upwardmost position with a minimum of expended force. Since the movement of the ball 18 approaches a horizontal axis, a large portion of the force exerted by the weight of the ball 18 is supported by the members 36 and only a relatively small force need be exerted by the flowing fluid on the ball 18 to retain the latter in its second position. Consequently, flutter of the ball 18 is substantially reduced and in most cases eliminated, thus reducing fluid turbulence within the chamber 22 which could otherwise lead to cavitation. Such an advantage is particularly useful in applications utilizing low pressure pumps.

The cover body 16 is provided with a flow guiding inclined, curved wall or stop 44 which contacts the ball 18 when the latter is in its second, upwardmost position. By comparison of FIGS. 1 and 3, it will be seen that the stop 44 engages in point contact only a very relatively small surface portions of the ball 18. As such, the ball 18 in its upwardmost position rests in three point contact against the two surfaces 38, 38 and the stop 44, while the remaining portions of the housing 12 are sufficiently spaced from the ball 18 to enable fluid to completely flow around the remaining portions of the ball 18 and to continually flush solid matter from the ball 18 whenever fluid flows through the assembly 10. As illustrated in FIG. 3, two channels 46, 46 are thus provided between the stop 44 and the surfaces 38, 38 to enable the flow of fluids completely around the remaining areas of the ball 18 and to prevent the accumulation of stagnant fluid within the chamber 22.

The substantially straight configuration of the fluid passageway 34, as best understood by reference to FIGS. 1 and 4, exerts a minimum amount of pressure drop on the fluid as the latter flows from the inlet 26, through the chamber 22 and toward the outlet 32. At the same time, the configuration of the ball guiding members 36 is such to shift the ball 18 toward a position spaced laterally from the fluid passageway 34 and the fluid inlet 26 so that the ball 18 when in its upwardmost position does not hinder the flow of fluids through the housing 12. Consequently, the assembly 10 can easily pass fluids containing large quantities of solid matter, such as particulates or debris, even when such solid matter is of a relatively large size.

Advantageously, the cover body 16 can be readily removed from the casing 14 for inspection and repair, if necessary, of the assembly 10. The provision of the outwardly extending members 36, 36 which matingly fit with inner surfaces of the casing 14, enables the ball 18 to be removed from the chamber 22 as soon as the casing 14 is separated from the body 16.

What is claimed is:

1. A check valve comprising:
   a housing having walls defining a fluid inlet, a fluid outlet and a chamber communicating with said inlet and with said outlet,
   said chamber presenting a substantially straight fluid passageway from said inlet and to said outlet; and
   a ball having a diametric cross-sectional area larger than the area of said inlet,
   said housing including structure for guiding said ball along a path of travel between a first, flow impeding position adjacent said inlet and a second position spaced from said inlet laterally of said straight fluid passageway,
   said structure engaging said ball along two spaced side portions thereof as said ball is moved toward said second position,
   said housing including stop means engaging said ball at a location which is downstream from said second position and which is spaced from said two side portions when said ball is in said second position, thereby enabling the remaining surface areas of said ball to be cleansed by fluid flowing along said passageway when said ball is in said second position,
   said housing including a wall at a location downstream of said ball when said ball is in said second position,
   said wall being inlined relative to a reference plane transverse to said substantially straight fluid passageway and extending from said location downstream of said second position of said ball and directly along a generally straight line to said outlet for enhancing the characteristics of fluid flow around said ball and to guide the flow of said fluid and any solid matter in said fluid out of said housing,
   said check valve, including said housing, being spaced and out of contact with said ball at all elevations above said location of engagement with said ball when said ball is in said second position, such that said chamber presents an open area having horizontal dimensions in directions transverse to said passageway at least as large as the diametric cross sectional area of said ball.

2. A check valve comprising:
   a housing having walls defining a fluid inlet, a fluid outlet and a chamber communicating with said inlet and with said outlet,
   said chamber presenting a substantially straight fluid passageway from said inlet and to said outlet; and
   a ball having a diametric cross-sectional area larger than the area of said inlet,
   said housing including structure for guiding said ball along a path of travel between a first, flow impeding position adjacent said inlet and a second position spaced from said inlet laterally of said straight fluid passageway,
   said structure engaging said ball along two spaced side portions thereof as said ball is moved toward said second position,
   said housing including stop means engaging said ball at a location spaced from said side portions when said ball is in said second position, thereby enabling the remaining surface areas of said ball to be cleansed by fluid flowing along said passageway when said ball is in said second position,
   said housing comprising a generally bell-shaped casing presenting a flared, open end section and said housing also comprising a body removably connected to said casing end section for covering a portion of the latter.

3. The invention of claim 2, wherein said stop means comprises a wall of said body.

4. The invention of claim 3, wherein said structure comprises two spaced members of said body.

5. A check valve housing comprising:
   a generally bell-shaped casing having walls defining a chamber,
   said casing presenting a flared, open end section and a fluid inlet in generally opposed relation to said open end section; and
   a body removably connected to said casing end section for covering a portion of the latter,
   said body having a fluid outlet,
   said body including structure for guiding a ball along a path of travel between a first, flow impeding position adjacent said inlet and a second position spaced from said inlet,
   said structure being received within said chamber defined by said casing walls.

6. The invention of claim 5, wherein said structure comprises two spaced members engageable with opposed side regions of said ball.

7. The invention of claim 6, wherein said body also includes stop means engageable with a ball when said ball is in said second position.

8. The invention of claim 5, wherein said structure is configured such that said path of travel of said ball has a variable slope which approaches zero as said second position is approached.

9. The invention of claim 8, wherein said path of travel includes an arcuate portion and a substantially straight portion.

* * * * *